(12) United States Patent
Hung

(10) Patent No.: US 6,779,926 B2
(45) Date of Patent: Aug. 24, 2004

(54) HEAD CASING ASSEMBLY OF AN OPTICAL FIBER TRANSMISSION CABLE

(76) Inventor: Chen-Hung Hung, P.O. Box No. 6-57, Chung-Ho, Taipei 235 (TW)

(*) Notice: Subject to any disclaimer, the term of this patent is extended or adjusted under 35 U.S.C. 154(b) by 60 days.

(21) Appl. No.: 10/286,835

(22) Filed: Nov. 4, 2002

(65) Prior Publication Data

US 2004/0086237 A1 May 6, 2004

(51) Int. Cl.[7] ................................................ G02B 6/36
(52) U.S. Cl. ........................................................ 385/78
(58) Field of Search .............................. 385/78, 79, 77

(56) References Cited

U.S. PATENT DOCUMENTS 6,595,697 B2 * 7/2003 Hirabayashi et al. ......... 385/78
6,607,306 B2 * 8/2003 Ozeki et al. .................. 385/78
6,637,946 B2 * 10/2003 Cheng ........................... 385/77
6,648,521 B2 * 11/2003 Roehrs et al. ................ 385/84
6,652,156 B2 * 11/2003 Shinagawa et al. .......... 385/78

* cited by examiner

Primary Examiner—Neil Abrams
Assistant Examiner—Phuong Dinh
(74) Attorney, Agent, or Firm—Troxell Law Office PLLC

(57) ABSTRACT

A head casing assembly of an optical fiber transmission cable has a post-shape member axially disposed inside the head casing; the post-shape member is made of a plastic composite material; being easy for processing, the plastic composite material enables the post-shape member to have extremely high precision. The post-shape member and an optical fiber core wire are glued; after the glue hardens, a piece of regular grind paper is used to grind the post-shape member and the optical fiber core wire so as to lower the processing time and cost as well as enhance the economical effect and ensure the effective transmission of optical signals.

3 Claims, 4 Drawing Sheets

HEAD CASING ASSEMBLY OF AN OPTICAL FIBER TRANSMISSION CABLE

BACKGROUND OF THE INVENTION

1) Field of the Invention

The present invention relates to a head casing assembly of an optical fiber transmission cable comprising a post-shape member axially disposed inside the head casing; the post-shape member is made of a plastic composite material; being easy for processing, the plastic composite material enables the post-shape member to have extremely high precision. The post-shape member and an optical fiber core wire are applied by a kind of glue; after the glue hardens, a piece of regular grind paper is used to grind the post-shape member and the optical fiber core wire so as to lower the processing time and cost.

2) Description of the Prior Art

Recently, the advanced technique of telecommunication enables a live time Olympic Game held on one side of the globe to he viewed simultaneously by the television audience on another side. In the future, it is very possible and easy to implement the television for medical and educational purposes, the electronic transmission of mail and news, the popularization of family combined communication, information transmission and television-telephone. Therefore, the telecommunication capacity has to be augmented in hundred times. The features of an optical fiber include small diameter, wide band area and low damage; that makes the optical fiber the main material used for transmission channel in the telecommunication industry of transmitting such a large capacity of information.

The present operation of constructing an optical fiber telecommunication system uses a main line for transmission channel; a plurality of branch lines derive from the main line; the branch lines transmit the optical signals to each user end. A plurality of optical fiber jump joint cables (transmission cables) interconnect to increase the distance of the optical fiber communication.

As indicated in FIGS. 1 and 2, a conventional optical fiber jump joint cable (transmission cable) includes a head casing assembly (1) connecting with an optical fiber conductor wire (2). The head casing assembly (1) comprises a main body (3) and a head socket (4) connected with a distal end of the main body (3). A through receiving slot (5) communicates with a channel slot (6) of the head socket (4). The optical fiber conductor wire (2) has at least one optical core wire (7), a shielding layer (8) covering the outer portion of the optical fiber core wire (7) and a buffering layer (9) covering the outer portion of the shielding layer (8). When in use, parts of the shielding layer (8) and the buffering layer (9) have to be removed to expose a certain length of the optical fiber core wire (7). In addition, the outer portions of the optical fiber core wire (7) and the buffering layer (9) are spread with hot positioning glue for connecting with the head casing assembly (1). The final connection positions the optical fiber core wire (7) inside the receiving slot (5) of the main body (3) and the buffering layer (9) inside the channel slot (6) of the head socket (4). When the hot positioning glue hardens, the optical fiber conductor wire (2) is firmly positioned in the head casing assembly (1) to form an optical fiber transmission cable.

Since the optical transmission cable only has a certain length regulation, an optical fiber adapter has to be disposed between the optical fiber transmission cables for connection in order to increase the distance of optical fiber communication. Furthermore, since the optical telecommunication system requires constant cleansing, maintenance and circuit alternation, constant detachments and installations are necessary between the optical fiber transmission cable and the optical fiber adapter. Therefore, the main body (3) must have good insertion and pulling endurance to meet the requirement of the international electronic appliance regulation of the U.S.A.

In order to have a good insertion and pulling endurance for the main body (3), the entire member is made of ceramic material and that increases the cost. When processing the main body (3), it is necessary to request the precision of the inner diameter and concentricity of the receiving slot (5). However, since the main body (3) is made of ceramic material, the controlling of the processing and precision is more difficult thereby increasing the processing cost. Furthermore, it is necessary to consider cost and time to be increased due to the use of diamond grinding paper to grind the end head of the optical fiber core wire (7).

SUMMARY OF THE INVENTION

Therefore, the primary objective of the present invention is to provide a head casing assembly of an optical fiber transmission cable; a post-shape member is disposed axially in side the main body of the head casing; the post-shape member is made of plastic composite material; being easy for processing allows the post-shape member to have extremely high precision and to tremendously reduce the tedious manufacturing procedures.

The secondary objective of the present invention is to provide a head casing assembly of an optical fiber transmission cable; after the post-shape member and the optical fiber core wire are glued and when the glue hardens, the post-shape member and the optical fiber core wire are grinded by a regular grind paper so as to reduce the processing time and cost.

To enable a further understanding of the structural features and the technical contents of the present invention, the brief description of the drawings below is followed by the detailed description of the preferred embodiment.

DETAILED DESCRIPTION OF THE PREFERRED EMBODIMENTS

Figure 1:
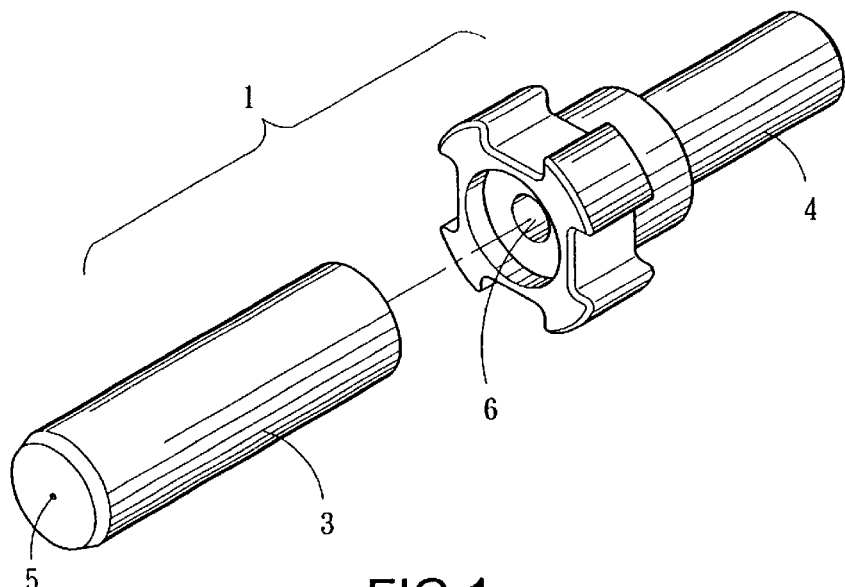
FIG. 1 is a pictorial and exploded drawing of a head casing assembly a convention optical fiber transmission table.
Figure 2:
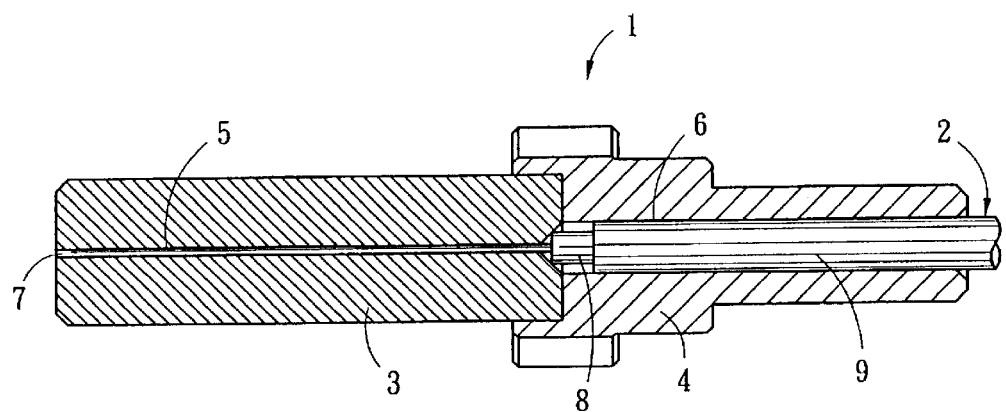
FIG. 2 is a cross-sectional drawing of the connection between a conventional head casing assembly and a distal end of the optical fiber conductor wire.
Figure 3:
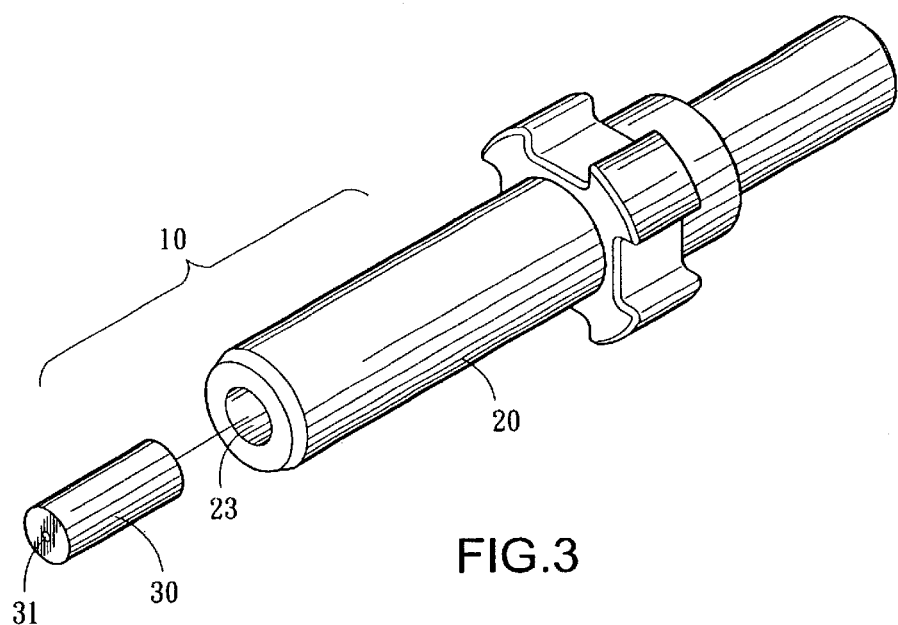
FIG. 3 is a pictorial and exploded drawing of a head casing assembly of the present invention.
Figure 4:
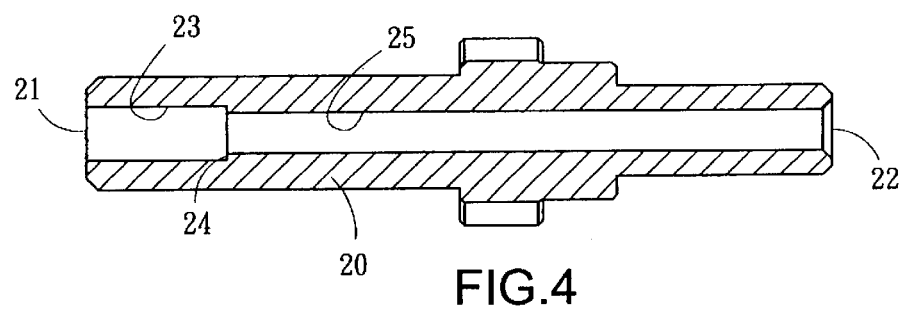
FIG. 4 is a cross-sectional drawing of a head casing main body of the present invention.
Figure 5:
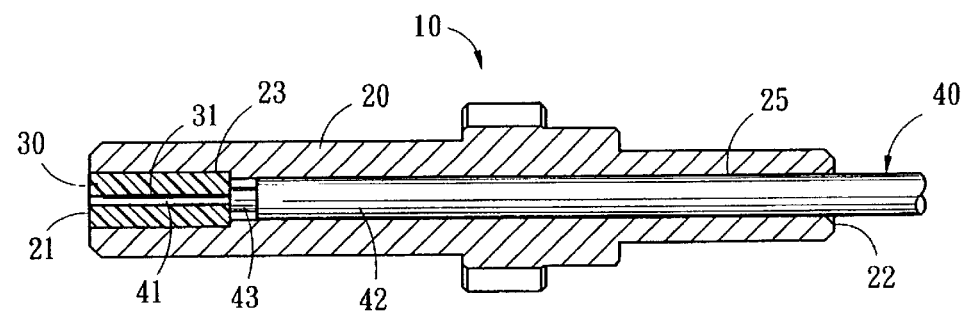
FIG. 5 is a cross-sectional drawing of the connection between the head casing assembly of the present invention and a distal end of the optical fiber conductor wire.

FIGS. 3 to 5 show the first preferred exemplary embodiment of a head casing assembly (10) of an optical fiber transmission cable of the present invention. The head casing assembly (10) connects with an optical fiber conductor wire (40) to form an optical fiber transmission cable; the head casing assembly (10) comprises a main body (20) and a post-shape member (30).

The main body (20) is made of ceramic or metal material and has opposite front and rear side portions (21, 22). A channel slot (23) extends from the front side portion inwardly and ends at an annular flat bottom (24). A receiving slot (25) extends axially from the annular flat bottom (24) to the rear side portion (22).

The post-shape member (30) is made of plastic composite material including glass, plastic or other organic material. A through channel (31) is disposed in the inner portion of the post-shape member (30) which is axially disposed inside the channel slot (23).

After preparing a free end of the optical fiber conductor wire (40), it is necessary to spread a layer of hot positioning glue onto an optical fiber core wire (41) and a buffering layer (42); the free end of the optical fiber conductor wire (40) inserts from the receiving slot (25) of the main body (20) all the way to the terminal end of a shield layer (43) to be flash with an end side of the post-shape member (30). At the final connecting position, the receiving slot (25) engages the outer surface of the shield layer (42) while the through channel (31) engages the outer surface of the optical fiber core wire (41). When the hot positioning glue hardens, the optical fiber conductor wire (40) and the head casing assembly (10) connect, as shown in FIG. 5.

Figure 6:
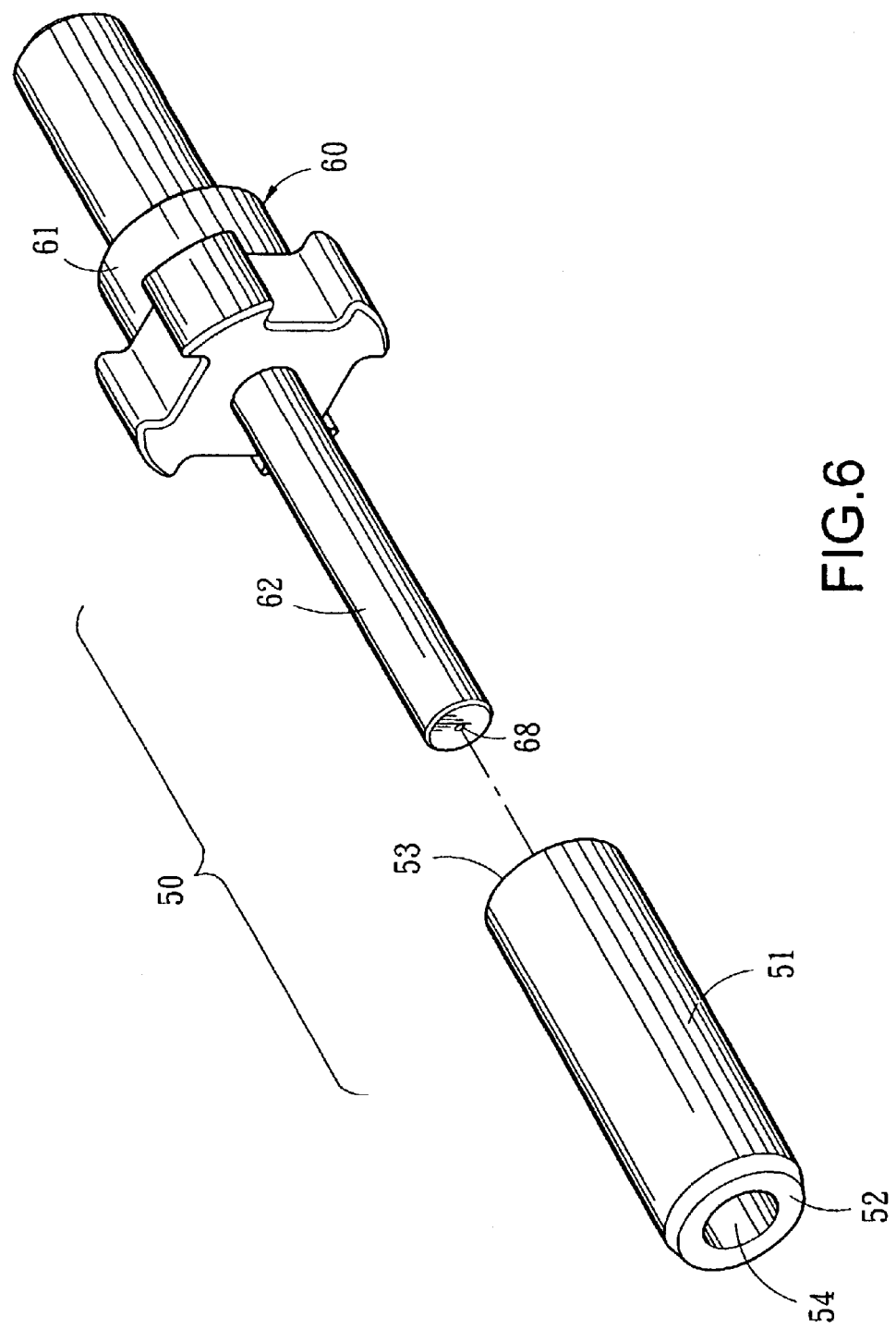
FIG. 6 is a pictorial drawing of another exemplary embodiment of the head casing assembly of the present invention.
Figure 7:
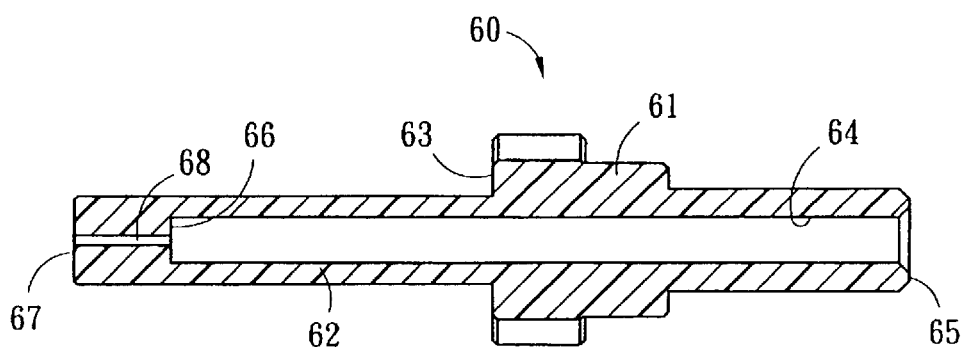
FIG. 7 is a cross-sectional drawing of the head socket shown in FIG. 6.
Figure 8:
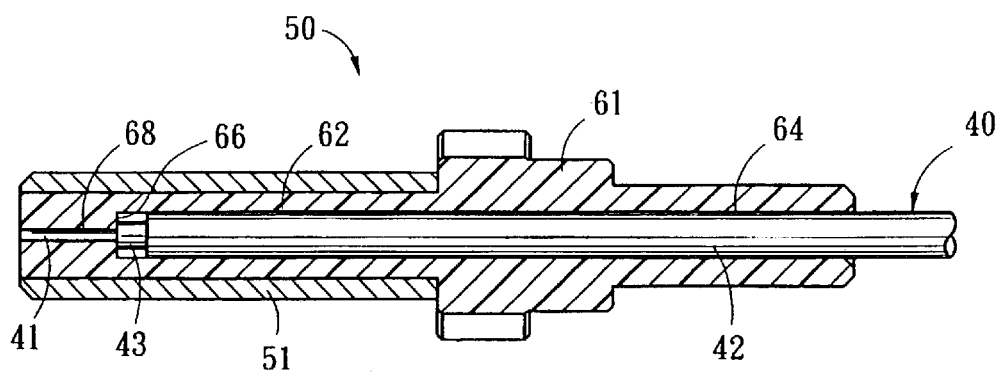
FIG. 8 is a cross-sectional drawing of the connection between the head casing assembly shown in FIG. 6 and a distal end of the optical fiber conductor wire.

FIGS. 6 to 8 show the second preferred exemplary embodiment of the head casing assembly (50) of an optical fiber transmission cable of the present invention. The head casing assembly (50) comprises a main body (51) and a head socket (60). The main body (51) is made of ceramic material and has opposite front and rear side portions (52, 53); a channel slot (54) extends axially from the front side portion (52) to the rear side portion (53).

The head socket (60) made of plastic composite material comprises a supporting base (61) and a post-shape member (62). The post-shape member (62) extends axially and outwardly from a front end side (63) of the supporting base (61). A receiving slot (64) extends axially from a rear end side (65) of the supporting base (61) to the post-shape member (62) and the inner portion thereof ends at an annular flat bottom (66). The supporting base (61) and the post-shape member (62) connect into one unit. A front side portion (67) of the post-shape member (62) extends inwardly to form a through channel (68) communicating with the receiving slot (64).

The main body (51) is injection-molded to connect the channel slot (54) thereof onto the post-shape member (62) such that the main body (51) is coaxially disposed on the outer surface of the post-shape member (62).

After preparing a free end of the optical fiber conductor wire (40), it is necessary to spread a layer of hot positioning glue onto an optical fiber core wire (41) and a buffering layer (42); the free end of the optical fiber conductor wire (40) inserts from the receiving slot (64) of the head socket (60) all the way to the terminal end of a shield layer (43) to be flash with an end side of the annular flat bottom (66). At the final connecting position, the receiving slot (64) engages the outer surface of the shield layer (42) while the through channel (68) engages the outer surface of the optical fiber core wire (41). When the hot positioning glue hardens, the optical fiber conductor wire (40) and the head casing assembly (50) connect, as shown in FIG. 8.

In summation, the present invention provides a head casing assembly of an optical transmission cable. The post-shape member thereof is made of plastic composite material; being easy for processing, the plastic composite material enables the post-shape member to have extremely high precision. After the post-shape member and the optical fiber core wire are glue and when the glue hardens, a piece of regular grind paper is used to grind the post-shape member and the optical fiber core wire so as to lower the processing time and cost as well as enhance the economical effect and ensure the effective transmission of the optical signal.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A head casing assembly of an optical fiber transmission cable connects with an optical fiber conductor wire to form an optical fiber transmission cable; wherein the head casing assembly comprising:

a head casing main body with opposite front and rear side portions; wherein a channel slot extends from the front side portion thereof inwardly and ends at an annular flat bottom; a receiving slot extends axially from the annular flat bottom to the rear side portion thereof;

a post-shape member made of plastic composite material; a through channel is disposed in the inner portion thereof; the post-shape member is axially disposed inside the channel slot; when the optical fiber conductor wire completely inserts into the head casing assembly, the through channel thereof connects with the outer portion surface of an optical core wire; the receiving slot thereof connects with an outer portion surface of a buffering layer.

2. A head casing assembly of an optical fiber transmission cable connects with an optical fiber conductor wire to form an optical fiber transmission cable; wherein the head casing assembly comprising:

a supporting base made of plastic composite material with a through receiving slot disposed therein;

a post-shape member made of plastic composite material; it connects with an end side of the supporting base; its inner portion has an adjacent and communicating through channel and receiving slot; the receiving slot thereof leads to the receiving slot of the supporting base;

a head casing assembly with a through channel slot disposed therein and tightly connecting with the outer portion surface of the post-shape member; when the optical fiber conductor wire completely inserts into the head casing assembly, the through channel of the post-shape member and the outer portion surface of an optical core wire connect; the receiving slots of the supporting base and the post-shape member connect with an outer portion surface of a buffering layer.

3. The head casing assembly of an optical fiber transmission cable according to claim 1, wherein the supporting base and the post-shape member connect into one unit.

* * * * *